(12) United States Patent
Brockmann et al.

(10) Patent No.: US 10,053,079 B2
(45) Date of Patent: Aug. 21, 2018

(54) REDUNDANT SIGNAL PROCESSING OF A SAFETY-RELEVANT APPLICATION

(71) Applicant: WABCO GmbH, Hannover (DE)

(72) Inventors: Christoph Brockmann, Hemmingen (DE); Andreas Goers, Pattensen (DE); Jann Loll, Hannover (DE); Marco Michel, Hannover (DE); Otmar Struwe, Hannover (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 14/904,968

(22) PCT Filed: Jun. 18, 2014

(86) PCT No.: PCT/EP2014/001666
§ 371 (c)(1),
(2) Date: Jan. 14, 2016

(87) PCT Pub. No.: WO2015/010756
PCT Pub. Date: Jan. 29, 2015

(65) Prior Publication Data

US 2016/0144844 A1    May 26, 2016

(30) Foreign Application Priority Data

Jul. 26, 2013   (DE) .................. 10 2013 012 497

(51) Int. Cl.
*B60T 8/88*   (2006.01)
*B60T 17/22*  (2006.01)
(Continued)

(52) U.S. Cl.
CPC ............ *B60T 17/221* (2013.01); *B60T 8/885* (2013.01); *G05B 9/03* (2013.01); *B60T 2270/413* (2013.01); *G06F 11/16* (2013.01)

(58) Field of Classification Search
CPC .. B60T 8/885; B60T 17/221; B60T 2270/406; B60T 2270/413
See application file for complete search history.

(56) References Cited

U.S. PATENT DOCUMENTS 4,546,437 A    10/1985   Bleckmann et al.
5,862,502 A *  1/1999   Giers ................. B60T 8/885
                                                  303/122

(Continued)

FOREIGN PATENT DOCUMENTS

DE   32 34 637 A1    3/1984
DE   197 16 197 A1  10/1998
(Continued)

OTHER PUBLICATIONS

EGas Workgroup: "Standardized E-Gas Monitoring Concept for Gasoline and Diesel Engine Control Units", IAV Web Pages, Jul. 5, 2013; p. 10, line 4—p. 13, line 20; p. 28, line 4—p. 30, line 35.

*Primary Examiner* — Kimberly S Berona
*Assistant Examiner* — Anshul Sood
(74) *Attorney, Agent, or Firm* — Warner Norcross & Judd LLP

(57) ABSTRACT

To effect redundant signal processing of a safety-relevant application, such as for a safety control unit of a motor vehicle, at least two redundant signals are fed from at least one sensor to an electronic circuit assembly as input signals for processing. At least one input signal is converted into a different test signal. In the electronic circuit assembly, the input signals are fed to a first peripheral module of a microcontroller, and the test signal is fed to an additional peripheral module. The sensor information of the input signals and of the test signal are thus redundantly processed independently of each other in a respective peripheral module of the microcontroller.

11 Claims, 1 Drawing Sheet

(51) Int. Cl.
    *G05B 9/03*         (2006.01)
    *G06F 11/16*     (2006.01)

(56) References Cited

U.S. PATENT DOCUMENTS

| | | |
|---|---|---|
| 6,823,251 B1 | 11/2004 | Giers |
| 2006/0232124 A1 | 10/2006 | Friederich et al. |
| 2007/0282459 A1 | 12/2007 | Schafer et al. |
| 2011/0040430 A1* | 2/2011 | Tessier ............... G01C 21/16 |
| | | 701/3 |
| 2012/0221897 A1 | 8/2012 | Richter |
| 2013/0267944 A1* | 10/2013 | Krapohl ............ A61B 18/1233 |
| | | 606/34 |
| 2014/0019818 A1* | 1/2014 | Jindal ............... G06F 21/556 |
| | | 714/724 |

FOREIGN PATENT DOCUMENTS

| | | |
|---|---|---|
| DE | 100 56 129 A1 | 5/2002 |
| DE | 101 62 689 A1 | 7/2002 |
| DE | 103 25 650 A1 | 12/2004 |
| DE | 10 2005 005 995 A1 | 6/2006 |
| DE | 10 2006 017 302 A1 | 10/2007 |
| DE | 10 2006 053 617 A1 | 5/2008 |
| DE | 10 2010 006 061 A1 | 8/2011 |
| DE | 10 2011 122 776 A1 | 1/2013 |
| GB | 2 451 559 A | 2/2009 |

* cited by examiner

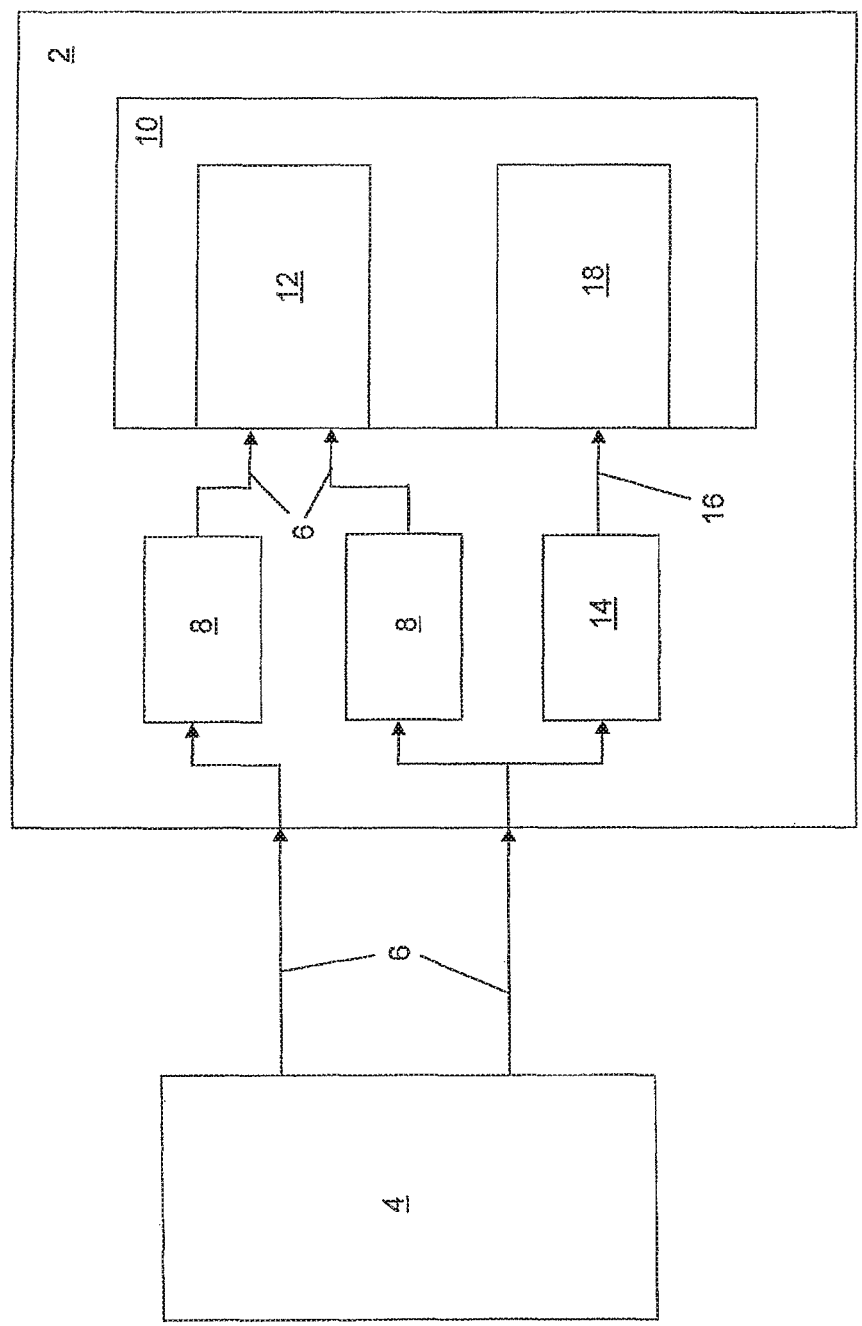

REDUNDANT SIGNAL PROCESSING OF A SAFETY-RELEVANT APPLICATION

FIELD OF THE INVENTION

The present invention generally relates to redundant signal processing of a safety-relevant application, such as a safety control unit of a motor vehicle.

BACKGROUND OF THE INVENTION

Electronic motor vehicle control devices, such as, for example, ABS and/or EBS brake control devices, often comprise redundant signal processing systems in order to be suitable for modern safety-relevant applications. In this case, the requirements on the components are steadily increasing. As the complexity of the individual components increases, however, so does the possibility of malfunctions. Due to the increasing requirements on the components, for example, control devices, the components are produced according to specified safety regulations.

One example of an antilock vehicle brake system is known from DE 32 34 637 C2. In this case, the input data are fed in parallel to two identically programmed microcontrollers and are synchronously processed there. The signals are compared in-between and at the output. If a deviation of the signals from one another occurs, a shut-off signal is output. Due to a second microcontroller, which is identical to the first microcontroller in terms of its design and its programming, at least some data processing errors can be detected. Such a system requires two high-quality microcontrollers, however, even though a single microcontroller would suffice for generating the actual control signals, whereby the expenditure for microcomputers doubles due to safety reasons.

To rule out a possible source of errors due to a system design error or a system production error of the microcontroller, the two systems would also have to be developed by independent programmers, whereby the expenditure increases even further.

SUMMARY OF THE INVENTION

Generally speaking, it is an object of the present invention to provide a simple and cost-effective method and an electronic circuit to detect system malfunctions with the reliability required for safety-relevant applications.

According to an embodiment of the present invention, to effect redundant signal processing of a safety-relevant application, such as, for example, for an ABS or EBS control device of a motor vehicle, at least two redundant signals are fed from at least one sensor to an electronic circuit as input signals for processing the sensor information. Preferably, the input signals are provided by two independent sensors in order to detect errors in the generation of the sensor signals due to a faulty sensor or to ensure the functional reliability of the system in the event of failure of one sensor.

The transmission device for transmitting the sensor signals likewise has a redundant design to detect possible transmission errors. Therefore, at least two sensor signals are available to the electronic circuit as input signals for processing the sensor information. The input signals are transmitted to a peripheral module of a microcontroller either directly or via a protective circuit that protects against overvoltage. Preferably, the peripheral module comprises a software module designed to compare the received signals with each other. Possible sources of errors can be ascertained on the basis of present deviations, and the safety-relevant application can be transferred into a safe state.

The functionally independent paths via the two redundant input signals can be simultaneously influenced, however, if a system design error or a system production error is present in the peripheral module of the microcontroller. Such an error could influence both input signals simultaneously and result in a simultaneous failure or a malfunction of the system.

To minimize the risk of malfunctions of safety-relevant electronic circuits, according to an embodiment of the present invention, at least one input signal is converted into a test signal. To this end, the electronic circuit comprises at least one input circuit, which is designed to generate a test signal from the input signal, which test signal differs from the input signal but retains the sensor information.

The test signal, as is likewise the case with the one or more input signals, is fed to the microcontroller for processing. Since the test signal differs from the input signal, the respective peripheral modules are also differently designed, and the test signal is processed in an additional peripheral module independently of the input signal, whereby processing the sensor information is advantageously made redundant. Since the peripheral modules meet the same processing goal, the signals or data can be compared after the processing, and possible system errors within the peripheral modules can be detected.

According to an embodiment of the present invention, the peripheral modules of the microcontroller for the redundant signal processing comprise software modules, which differ from one another, having different software drivers. It is therefore advantageously possible to avoid malfunctions or failures of the system resulting from faulty programming.

In another embodiment, the input circuit, which converts the input signal into an analog test signal, is designed as a low-pass filter if the input signal is a pulse-width modulated signal. Alternatively, the input circuit, which converts the input signal into a pulse-width modulated test signal, comprises a voltage-controlled oscillator (VCO) if the input signal is an analog voltage or current signal. By means of such input circuits, available input signals can be easily converted into different signals to permit redundant processing by two independent, different peripheral modules.

According to a further embodiment means are provided for detecting significant deviations between the results of the redundantly processed sensor information of the input signal and of the test signal. If such deviations are present, the control systems affected by the deviating data can be advantageously transferred into a safe state. It is therefore possible to avoid wrong decisions by systems, which can possibly pose a danger.

The inventive embodiments have application in a motor vehicle brake system, for example, an ABS or EBS.

It should be appreciated that use of a circuit arrangement according to embodiments of the present invention advantageously ensures the functional safety of a system, in particular of a motor vehicle brake system or of a motor vehicle having electronic components.

Still other objects and advantages of the present invention will in part be obvious and will in part be apparent from the specification.

The present invention accordingly comprises the features of construction, combination of elements, and arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below with reference to the accompanying drawing FIGURE, in which:

FIG. 1 is a block diagram of an electronic circuit arrangement according to an embodiment of the present invention comprising a sensor system and a transmission device.

DETAILED DESCRIPTION OF THE PREFERRED EMBODIMENTS

FIG. 1 schematically shows a redundantly operating system comprising an electronic circuit arrangement 2, which has at least one control functionality.

It is known to provide safety devices, which can detect system errors, in electronic circuit arrangements, such as, for example, control devices for motor vehicle brake systems. When an error is detected, suitable countermeasures can be implemented and the control device can be shut off or switched into an emergency mode. To detect errors, safety-relevant circuit components are often redundantly designed, i.e., in multiples. A corresponding comparison of the functions of the circuit components present in multiples reveals possible errors.

Therefore, in FIG. 1, a sensor system 4 is provided with two sensors, which detect the same measured variable independently of each other. The sensor information of the two sensors is contained in two received signals 6, which are transmitted to the electronic circuit arrangement 2 via a transmission device, for example, via two separate bus systems.

The input signals 6 are initially fed to two input circuits 8 of the electronic circuit arrangement 2. The input circuits 8 are intended only for protection against possible overvoltages, however, and are therefore considered optional, and so the input signals 6 are transmitted to a microcontroller 10, in particular to a first peripheral module 12 of the microcontroller 10.

In the exemplary embodiment shown in FIG. 1, the received signals 6 are pulse-width modulated signals of the sensor system 4. The sensors sense, for example, the displacement of the brake pedal and output this as a pulse-width modulated electric signal.

The first peripheral module 12 is preferably a reception/comparison unit, which can receive and compare signals. By means of the comparison of the input signals 6, the transmission device is checked for possible errors.

The first peripheral module 12 further comprises a first software module having an associated software driver, with which a braking demand is ascertained from the sensor information and a corresponding release of the pressure control is carried out.

However, if the first peripheral module 12 has a system error, for example, faulty programming of the first software module, a malfunction of the system, in particular of the microcontroller 10, can result despite the redundant transmission of the sensor information.

To rule out such singular causes of error (common cause failure—CCF), which can simultaneously influence functionally independent paths in a system, an input signal 6 is converted in an additional input circuit 14 into a test signal 16.

According to the exemplary embodiment in FIG. 1, the additional input circuit 14 is a low-pass filter, with which the pulse-width modulated input signal 6 is converted into an analog test signal 16. The test signal 16 therefore differs from the input signal 6 but still contains all the sensor information.

For the further processing of the test signal 16, the test signal is transmitted to a second peripheral module 18 of the microcontroller 10. The second peripheral module 18 is intended for the redundant signal processing of the microcontroller 10, i.e., the first peripheral module 12 and the second peripheral module 18 have the same processing goal.

Since the test signal 16 differs from the input signal 6, however, the second peripheral module 18 uses a second software module, which differs from the first peripheral module 12, and a different software driver for the further processing of the sensor information. Preferably, the second peripheral module 18 is essentially an analog-digital converter with subsequent processing of the digital signal.

A subsequent comparison of the ascertained braking demand of the first peripheral module 12 with the ascertained braking demand of the second peripheral module 18 advantageously makes it possible to detect a singular cause of error in one of the peripheral modules 12, 18 if the result of the redundant signal processing of the two peripheral modules 12, 18 differs significantly from one another.

Alternatively, instead of the pulse-width modulated input signals 6, it is also possible to transmit two redundantly transmitted, analog current or voltage signals as input signals 6 to the electronic circuit arrangement 2. These analog current or voltage signals represent, for example, the braking pressure to be generated, which is specified via the actuation of the brake pedal.

If analog input signals 6 of the electronic circuit arrangement 2 are present, these are processed in a first peripheral module 12, with the goal of releasing the pressure control if the received signals 6 were transmitted without error.

A physically different test signal 16 is then generated from the analog input signal 6 in the additional input circuit 14. For example, the test signal 16 is a pulse-width modulated signal, which is generated by means of a voltage-controlled oscillator and is transmitted to the second peripheral module 18 for further processing.

Instead of a pulse-width modulated signal, it is also possible to provide additional types of modulation, such as, for example, pulse-frequency modulation, pulse-amplitude modulation, pulse-code modulation, or pulse-phase modulation, or any other type of modulation, such as, for example, amplitude modulation, angle modulation, or frequency/phase modulation, in order to transmit and/or convert the sensor signals.

In theory, it is possible to transmit any type of input signals 6 to an electronic circuit arrangement 2, wherein at least one input signal is converted into a different test signal 16.

To ensure the functional safety of the system, in particular of the motor vehicle brake system, in addition to the redundant transmission device for ensuring an error-free transmission of sensor signals, the software and hardware used in the microcontroller 10 for processing the sensor signals is also checked in terms of error-free function, by converting the input signal 6 into another test signal 16, and the subsequent evaluation of the received signal 6 in a peripheral module 12 and the evaluation of the test signal 16 in an independent peripheral module 18 are carried out separately.

A high level of safety of the system can therefore be achieved with the aid of the circuit arrangement 2. The circuit arrangement 2 can be advantageously realized with little production expenditure, since only one microcontroller 10 is used.

The inventive embodiments therefore comply with the new ISO (International Organization for Standardization) standard 26262 ("Road Vehicle—Functional Safety"), which is intended to ensure the functional safety of electrical or electronic systems in motor vehicles.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for redundant signal processing of a safety-relevant application, the method comprising:
    feeding at least two redundant signals from first and second sensors to an electronic circuit as first and second input signals for processing sensor information;
    processing the first and second input signals in a first peripheral module of a microcontroller of the electronic circuit to detect an error associated with at least one of the first and second sensors and to determine a braking demand;
    converting at least one of the first and second input signals into a test signal, the test signal differing from the first and second input signals but retaining the sensor information; and
    feeding the test signal to a second peripheral module of the microcontroller, different from the first peripheral module, for processing the sensor information of the test signal to redundantly determine the braking demand, the processing of the sensor information of the first and second input signals in the first peripheral module of the microcontroller and the processing of the test signal in the second peripheral module of the microcontroller being effected redundantly and independently such that the microcontroller is adapted to detect an error associated with the first peripheral module based on a difference between the braking demand determined by the first peripheral module and the braking demand determined by the second peripheral module,
    wherein the first peripheral module is functionally different from the second peripheral module such that, in the absence of the error associated with the first peripheral module, the first peripheral module and the second peripheral module determine a common braking demand based on different inputs thereto.

2. The method as claimed in claim 1, further comprising, when deviations exist between the sensor information of the first and second input signals and the sensor information of the test signal, transferring control systems affected by the deviations into a safe operating mode.

3. The method according to claim 1, wherein the safety-relevant application is a safety control unit for a motor vehicle.

4. The method as claimed in claim 1, wherein processing the first and second input signals in the first peripheral module includes comparing the first and second input signals with each other.

5. An electronic circuit, comprising:
    at least one microcontroller having a first peripheral module configured to process at least two redundant signals from first and second sensors, the first peripheral module being adapted to detect an error associated with the first or second sensor and determine a braking demand;
    at least one input circuit configured to convert one of the at least two redundant signals into a test signal, the test signal differing from the at least two redundant signals; and
    a second peripheral module of the microcontroller, the second peripheral module being configured to process sensor information contained in the test signal to redundantly determine the braking demand, wherein configuration of the first peripheral module and the second peripheral module is such that the processing of the sensor information of the at least two redundant signals in the first peripheral module of the microcontroller and the processing of the test signal in the second peripheral module of the microcontroller are effected redundantly and independently such that the microcontroller is adapted to determine an error associated with the first peripheral module based on a difference between the braking demand determined by the first peripheral module and the braking demand determined by the second peripheral module,
    wherein the first peripheral module is functionally different from the second peripheral module such that, in the absence of the error associated with the first peripheral module, the first peripheral module and the second peripheral module determine a common braking demand based on different inputs thereto.

6. The electronic circuit as claimed in claim 5, wherein the first peripheral module and the second peripheral module comprise software modules that differ from each other and have different software drivers.

7. The electronic circuit as claimed in claim 5, wherein the at least one input circuit is a low-pass filter for a pulse-width modulated signal, or wherein the at least one input circuit comprises a voltage-controlled oscillator for an analog voltage or current signal.

8. The electronic circuit as claimed in claim 5, wherein processing the at least two redundant signals in the first peripheral module includes comparing the at least two redundant signals with each other.

9. A motor vehicle brake system, comprising the electronic circuit as claimed in claim 5.

10. A motor vehicle, comprising the electronic circuit as claimed in claim 5.

11. A method for redundant signal processing of a safety-relevant application, the method comprising using the electronic circuit as claimed in claim 5 in a motor vehicle.

* * * * *